United States Patent
Zoldi et al.

(10) Patent No.: US 8,090,648 B2
(45) Date of Patent: Jan. 3, 2012

(54) FRAUD DETECTION BASED ON EFFICIENT FREQUENT-BEHAVIOR SORTED LISTS

(75) Inventors: Scott M. Zoldi, San Diego, CA (US); Hua Li, San Diego, CA (US); Xinwei Xue, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 310 days.

(21) Appl. No.: 12/398,141

(22) Filed: Mar. 4, 2009

(65) Prior Publication Data

US 2010/0228580 A1 Sep. 9, 2010

(51) Int. Cl.
*G06Q 40/00* (2006.01)
(52) U.S. Cl. .......................................... 705/38
(58) Field of Classification Search .................. None
See application file for complete search history.

(56) References Cited

U.S. PATENT DOCUMENTS

| | | | |
|---|---|---|---|
| 6,330,546 B1 * | 12/2001 | Gopinathan et al. | 705/35 |
| 6,983,368 B2 * | 1/2006 | Wheeler et al. | 713/170 |
| 7,333,923 B1 * | 2/2008 | Yamanishi et al. | 703/2 |
| 7,403,922 B1 * | 7/2008 | Lewis et al. | 705/38 |
| 7,760,862 B2 * | 7/2010 | Marchand et al. | 379/114.14 |
| 7,970,701 B2 * | 6/2011 | Lewis et al. | 705/38 |
| 2006/0101508 A1 * | 5/2006 | Taylor | 726/7 |
| 2006/0287902 A1 * | 12/2006 | Helsper et al. | 705/7 |
| 2008/0098466 A1 * | 4/2008 | Yoshida et al. | 726/5 |
| 2008/0140576 A1 * | 6/2008 | Lewis et al. | 705/67 |

OTHER PUBLICATIONS

Inferring Identify from user Behavior Carey, M.J. Tattersall, Lloyd-Thomas, H. Russell, IEE Proceedings-Vision, Image and Signal Processing vol. 150. No. 6, pp. 383, 6 pages.*

Against Classification attacks: A decision tree pruning approach to privacy protection in data mining Operations Research V. 57, N6 p. 1496, Nov. 2009.*

Trade Secret Piracy and Protection: Corporate espionage, Corporate security and the law, Advances in competitiveness Research, V12, n1, p. 57 Jan. 2004.*

* cited by examiner

*Primary Examiner* — Bruce I Ebersman
(74) *Attorney, Agent, or Firm* — Mintz, Levin, Cohn, Ferris, Glovsky and Popeo, P.C.

(57) ABSTRACT

A computerized method for detecting fraud includes obtaining frequency information on entities in transaction data for at least one individual account, converting frequency information to a frequency variable, and predicting whether an activity is fraudulent in response to the frequency variable. In some embodiments, the frequency variable is used with at least one other variable to predict fraudulent activity.

20 Claims, 5 Drawing Sheets

FRAUD DETECTION BASED ON EFFICIENT FREQUENT-BEHAVIOR SORTED LISTS

TECHNICAL FIELD

Various embodiments described herein relate to apparatus, systems, and methods associated with an apparatus and method for detecting fraud based on efficient frequent-behavior sorted lists.

BACKGROUND

In many instances, a phone may be stolen or a spending card may be stolen before a customer realizes it. In other instances, a customer may think that a phone or card may be misplaced and so the customer thinks the phone or card will turn up soon so a customer waits before reporting the item lost or stolen. During the time between reporting the phone or credit card as lost or stolen, a thief or a fraudster may use a phone to make downloads, buy music, buy ringtones and make expensive calls, such as to overseas locations. The thief or fraudster with a credit card or debit card will generally make a number of purchases involving large transactions amounts or will withdraw large amounts of money from a bank account via an automated teller machine (ATM). Phone companies, credit card issuers, or debit card issuers attempt to limit fraud losses by immediately closing a customer's account upon receiving a report that the card has been lost or stolen. Since fraud losses can mount quickly, analytics and predictive models have been used to detect fraud or abuse of credit cards, debit cards, telephone charge cards, cell phones, and the like. Many times, the customer is getting a call about suspicious or potentially fraudulent activity before they realize a card is gone or a cell phone has been stolen.

Fraudsters are becoming increasingly ingenious. For example, with the increase in communications and electronic transactions, incidents of fraud surrounding these activities has increased. One type of telecommunications fraud includes "cloning" a cellular telephone. In this type of telecommunications fraud, an identifier, such as a serial number, for a cellular telephone is snooped, or read, as calls are transmitted, captured, and used to identify calls transmitted by other cellular telephones. Once the identifier is obtained, a fraudster can fraudulently charge calls to the account holder of the original cellular telephone.

Other fraudulent activity includes stealing credit or debit card numbers. Some workers carry small readers for reading the vital information off of a credit card. A person may get a job as a waiter or cashier in a restaurant and when the customer provides his card, the card may be swiped as part of payment and swiped again using the small reader. The card information is captured and then the person misappropriating the card information will use the information to make unauthorized purchases, or sell the information related to the card to others who will place unauthorized purchases. There are other schemes where a group of bad actors set up bogus ATM machines. In one instance, a convenience store owner was given $100 to allow a bogus machine to be placed in the store. The ATM included a reader only so prospective customers would use the machine and then complain that it did not dispense money. The bad actor would pick up the machine after several days and take it for "repair" and would never return. The misappropriated card numbers would then be either sold or used to make various purchases.

In short, various fraudulent schemes result in large losses to various institutions. Generally, the losses are billions of dollars per year. In addition, certain fraudsters and thieves are becoming increasingly knowledgeable and may adapt their methods so that they can go undetected longer, thereby further increasing fraud loss amounts. Therefore, there is large demand for systems and methods to detect fraudulent transactions, as well as a continuing need to find better ways to detect fraud or abuse of credit cards, debit cards, cell phones and the like.

SUMMARY

The frequent-behavior sorted list method is such a fraudulent transaction detection method that dynamically tracks the frequently dialed phone numbers, the most frequently visited ATMs, or Point of Sale Merchants, or the like for an individual account. Deviation from such frequent spending behaviors indicates a higher probability of fraud. For instance, a phone user usually calls only a few phone numbers regularly (family and close friends); a debit card user usually withdraws cash from a few ATMs that are close to work or home.

In the telecommunication scenario, the set of most frequent called numbers by a phone user are usually fairly stable. Therefore, we can treat the set of the most frequent destination numbers extracted from the frequency-behavior list as a calling-signature of a phone user. A fraudster who steals several phones will have a similar calling pattern across all phones. In the repeat fraudster situation, finding similar signatures enables fraud analysts to identify phones linked to the same person despite fake or forged identity information. Hence, a fraudster signature database can be built to be compared against with the signature of phone user of each incoming transaction to identify repeated fraud.

DETAILED DESCRIPTION

Figure 1:
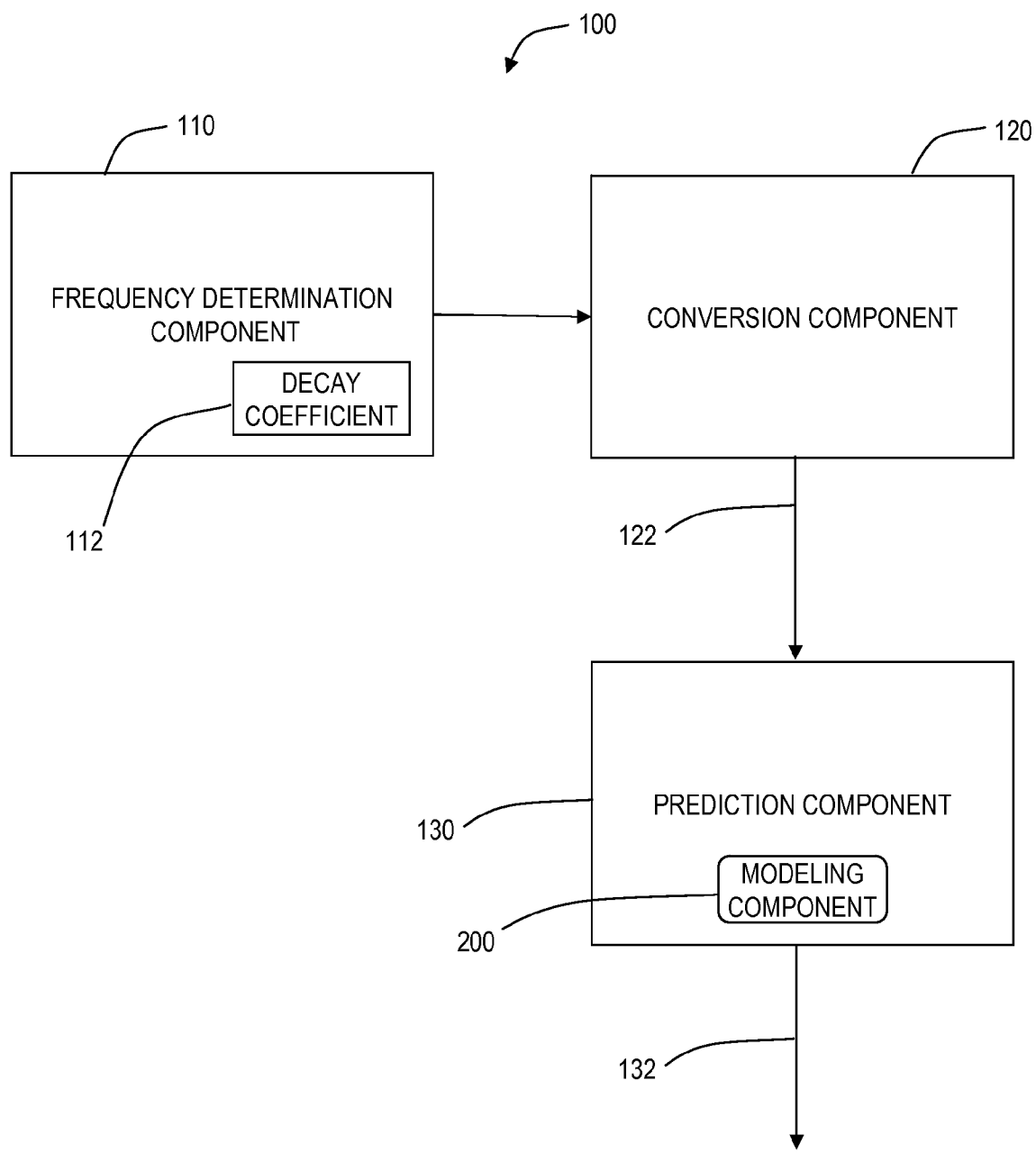
FIG. 1 is a block diagram of a system that is used to determine frequency information associated with a plurality of data transactions, according to an example embodiment.

FIG. 1 is a block diagram of a computer system 100 that is used to determine frequency information associated with a plurality of data transactions, according to an example embodiment. The computer system 100 includes a frequency determination component 110 for determining frequency information associated with a plurality of data transactions, and a conversion component 120 for converting the frequency information into a frequency variable. The frequency variable is an output 122 from the conversion component 120. In some embodiments, the output 122 includes a frequency table. The frequency table may be sorted and, in some embodiments, may take the from of a frequent-behavior sorted list that includes the most frequent transactions or behaviors associated with a specific account. The frequency-behavior sorted list forms a signature for a particular user.

The frequency determination component 110 may include a decay component portion 112 which decays past data transactions when a new data transaction is detected. A new frequency that is related to an account and to the plurality of data transactions associated with the account can be added to a table of transactions, thereby replacing an entry in the frequency table that has the least frequency. A frequency below a selected frequency threshold may be dropped or replaced on the frequency-behavior sorted list.

The computer system 100 also includes a prediction component 130 for predicting fraud based on the frequency variable output 122 from the conversion component 120. The prediction component 130, in some embodiments, includes a modeling component 200. The modeling component 200 predicts fraud in response to a plurality of variables, including the frequency variable and derived variables of the frequency variable. The prediction component 130 has an output 132.

Figure 2:
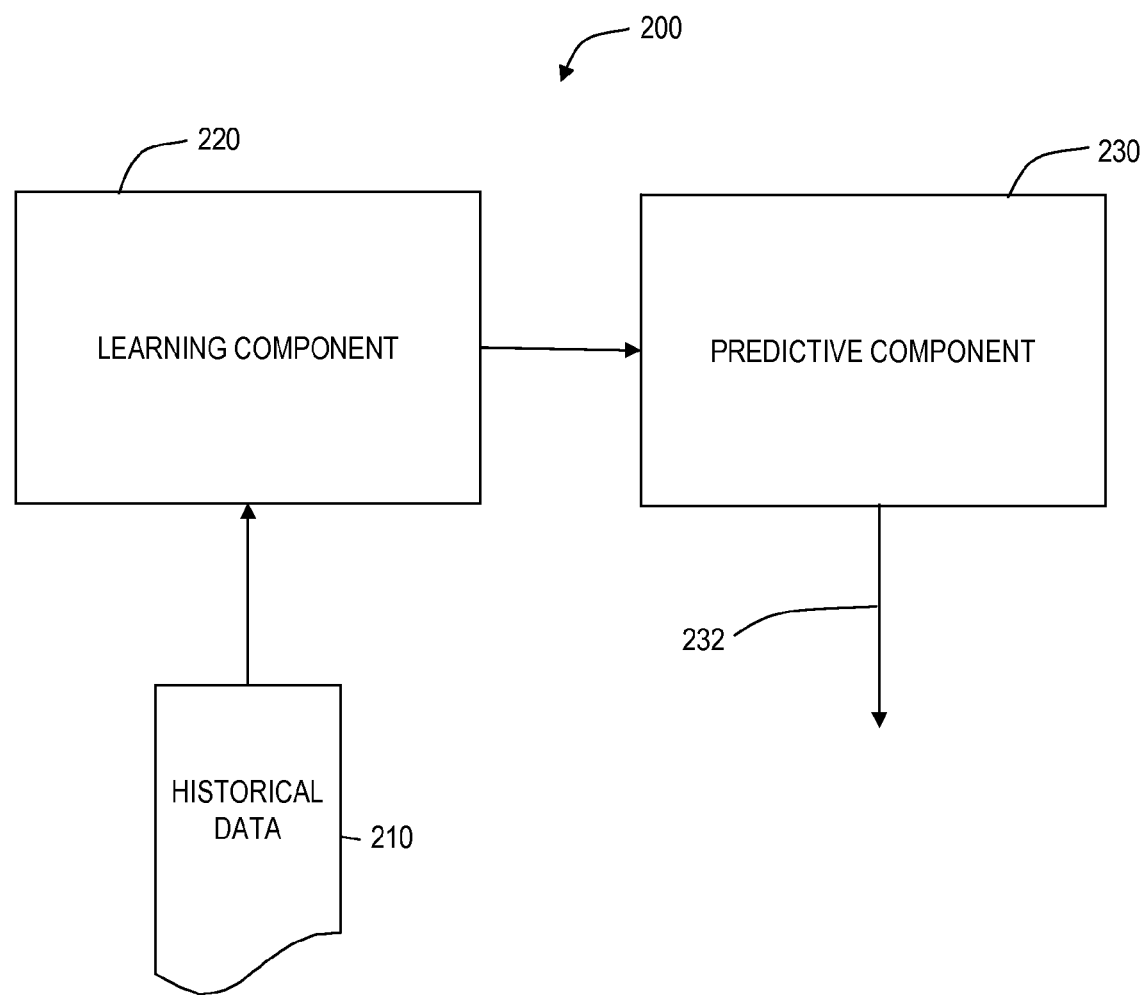
FIG. 2 is a block diagram of an example modeling component used in at least one embodiment of the system of FIG. 1, according to an example embodiment.

FIG. 2 is a block diagram of an example modeling component 200 used in at least one embodiment of the system 100 of FIG. 1, according to an example embodiment. The modeling component 200 includes a learning component 220 and a predictive component 230. The learning component 220 processes historical data 210 and recognizes various patterns. In this particular system, the historical data 210 is historical transaction data associated with a credit card, debit card, phone or the like. The historical data can be transaction data associated with an ATM, or can be transaction data associated with calls made by a person on an account. Patterns are typically found in the historical data. One or more variables are tested to find a correlation between the transaction data and known fraudulent actions. Once the variables are correlated to patterns in the historical data, the variables can be used to predict fraud or a higher probability of fraud using current data. Of course, the output can be fed back to the model to further test and refine the model in a feedback loop fashion. The predictive component 230 has an output 232 which may correspond to the output 132. In other embodiments, the output 232 may be combined with some other variable to form the output 132.

Figure 3:
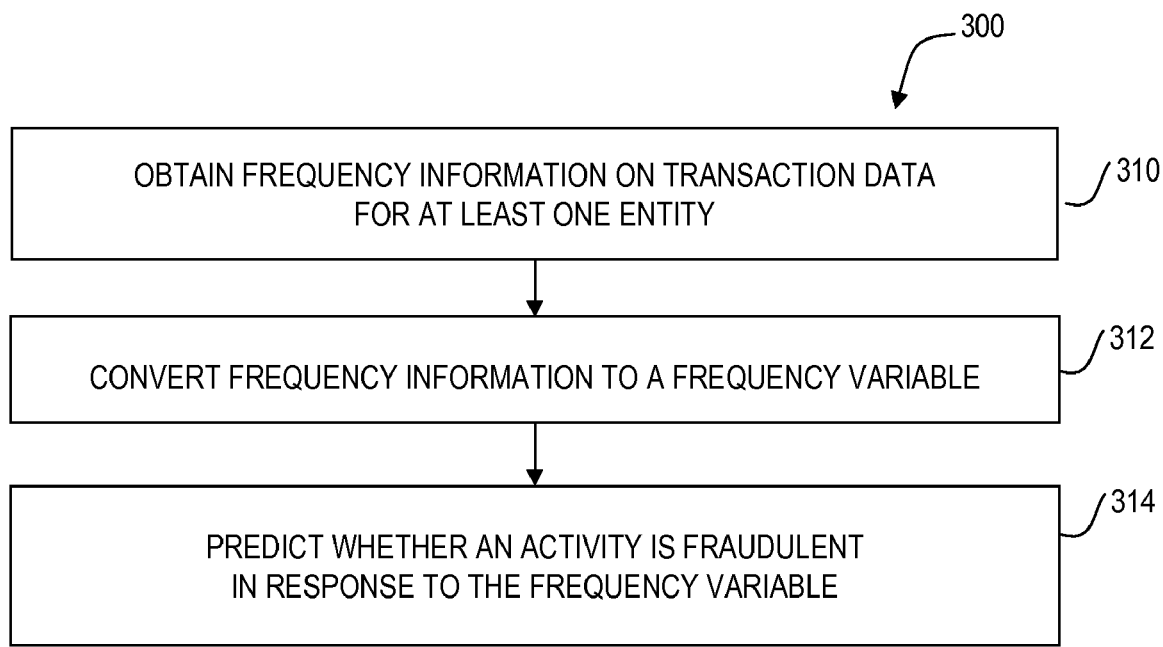
FIG. 3 a computerized method for detecting fraud using frequency data, according to an example embodiment.

FIG. 3 is a computerized method 300 for detecting fraud using frequency data, according to an example embodiment. The computerized method 300 for detecting fraud includes obtaining frequency information on transaction data for at least one entity 310, converting frequency information to a frequency variable 312, and predicting whether an activity is fraudulent in response to the frequency variable 314. The entity may be an account associated with a debit card or credit card. The entity can also be an account for a telephone or mobile phone. Frequency information can be kept on the basis of locations, times, merchant categories, or the like. More than one type of frequency information may be used. In some embodiments, the frequency variable may also be used with at least one other variable to predict fraudulent activity. In other embodiments, predicting whether an activity is fraudulent 314 includes utilizing the frequency variable in a model. In one embodiment, the frequency variable is associated with a frequency table. Detecting or obtaining the frequency information 310 can include updating a frequency table as the transaction occurs in real-time. In some instances the updating may be done dynamically in batch processing. Detecting or obtaining frequency information 310 can also include a portion or component which decays over time. When a frequency table is used, one or more of the entries may decay over time. There may also be a portion or component which updates the frequency data. When a frequency table is used, the frequency table can be updated by dropping the least frequent occurring event and replacing it with a more frequently occurring event. In some instances, a frequency related to a transaction is added to the frequency table to replace a less frequently occurring entry in the frequency table. The less frequently occurring entry may also have a frequency below a selected frequency threshold.

Frequency information can be gathered on many types of data transactions and used to give an indication of fraudulent activity. The data transactions may be related to telephone calls, credit card transactions, debit card transactions, or the like. In addition the frequency of data transactions obtained may be related to all types of financial transaction accounts, such as online banking, checking, DDA accounts, credit line accounts, and the like. In addition, the frequency of data transactions obtained may be related to IP addresses, ATM devices, or POS devices, and the like. In other words, this method is not restricted to certain types of accounts or devices but is widely applicable.

Frequency information regarding times, locations, and the like can also be gathered and used to generate information about the probability of a fraudulent transaction. For example, data related to the various data transactions can include not only the frequency of data transactions but also the location of the transaction. Locations can include unique terminal ID, street address, or postal code of one or more ATMs used most often by the card holder. Similar frequency information may be gathered for Point of Sale devices which are usually generally used by a specific merchant. The amount of the transaction, the time at which the transaction occurred, and the category of the transaction as well as the frequency of the transactions can also be obtained and used to determine probability of fraud. The destination phone number and frequency can also be used to determine the probability of telephone fraud. Most customers call certain numbers much more frequently than others.

Figure 4:
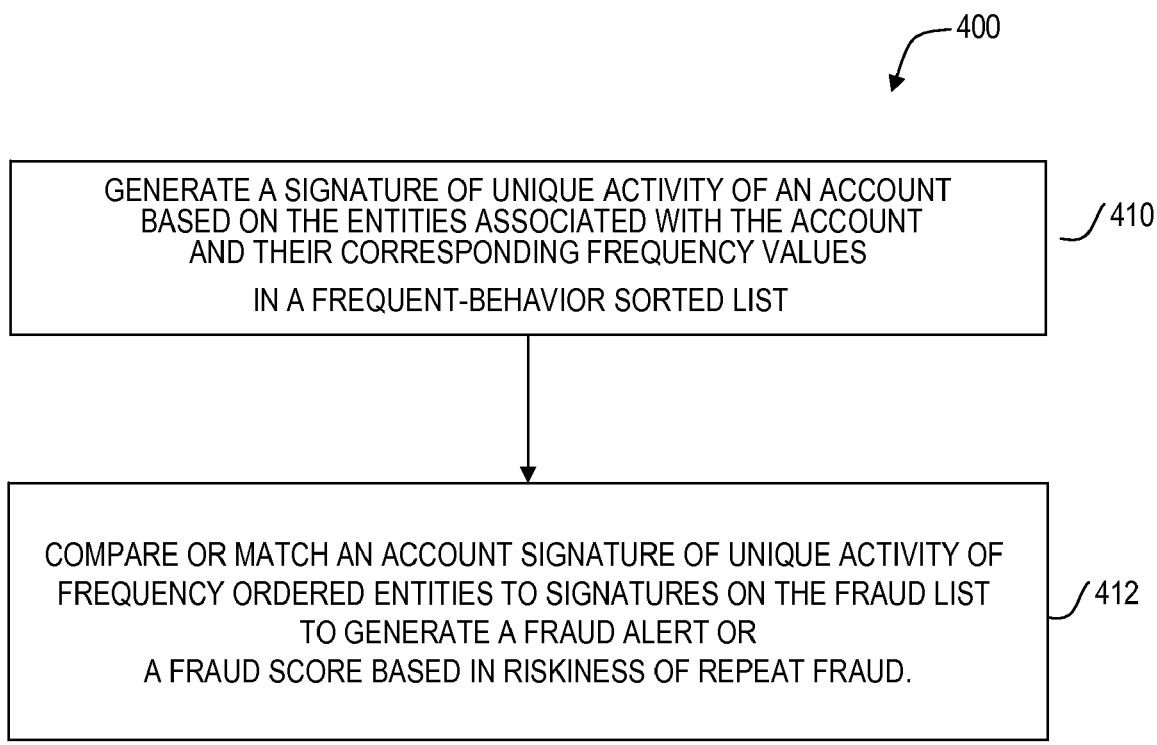
FIG. 4 is a flow diagram of a computerized method for detecting fraud based on signatures formed by behavior sorted lists, according to an example embodiment.

FIG. 4 is a flow diagram of a computerized method 400 for detecting fraud, according to an example embodiment. The computerized method 400 includes generating a signature 410 of unique activity of an account based on the entities associated with the account and their corresponding frequency values in a frequent-behavior sorted list. In on embodiment, the generated signature of unique activity of an account is based on the entities associated with the account and their corresponding frequency values in a frequent-behavior sorted list. The signature can be used in several ways. In one embodiment, the signature can be monitored for deviations in the pattern portrayed by the signature. The amount of variation from the signature can be useful in determining if there is a potential for fraud. In another embodiment, the signature is further used to identify potential fraudulent persons. The signature of unique activity of frequency ordered entities, such as destination telephone numbers, for example, are compared to a historical list of fraud signatures of specific entities and their ordered frequencies. The computerized method 400 compares or matches an account signature 412 of unique activity of frequency ordered entities to signatures on the fraud list to generate a fraud alert or a fraud score based in riskiness of repeat fraud. This can be useful in identifying if a particular criminal may be using a stolen phone, for example. Many times, a person will be linked to fraudulent acts with respect to the numbers dialed when they steal the phone. Criminals generally do not stop at spoofing or stealing one number or accessing one account. They tend to call the same set of numbers regardless of whose phone is being spoofed or used. By comparing their signature to other phones signatures, possible matches can be identified among other phone accounts.

Figure 5:
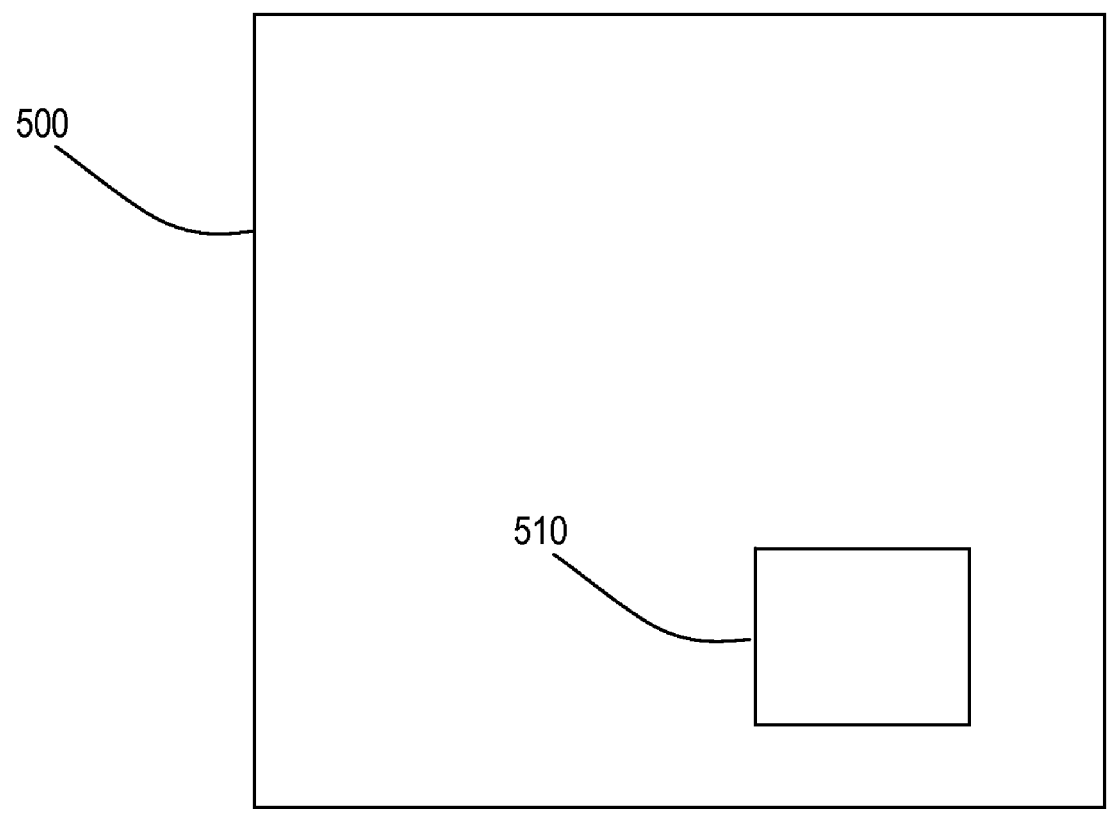
FIG. 5 is a machine or computer-readable media that includes a set of instructions, according to an example embodiment.

FIG. 5 is a machine-readable medium 500 that provides instructions 510 that, when executed by a machine, cause the machine to: obtain frequency information related to data regarding a plurality of transactions, convert frequency information to a frequency variable, and predict whether an activity is fraudulent in response to the frequency variable. The machine-readable medium 500 is any type of medium. As used herein, the term "machine-readable medium" refers to any computer program product, apparatus and/or device (e.g., magnetic discs, optical disks, memory, Programmable Logic Devices (PLDs), or a link to the Internet) used to provide machine instructions and/or data to a programmable processor, including a machine-readable medium that receives machine instructions as a machine-readable signal. The term "machine-readable signal" refers to any signal used to provide machine instructions and/or data to a programmable processor. Computer programs (also known as programs, software, software applications or code) include machine instructions for a programmable processor, and may be implemented in a high-level procedural and/or object-oriented programming language, and/or in assembly/machine language. The instructions on the machine-readable medium may also cause the machine to use the frequency variable and at least one other variable in a model to predict whether an activity is fraudulent. The instructions may also cause the machine to track the frequency of occurrence of data transactions over a selected time. In one embodiment, the frequency of occurrence of data transactions over a selected time is determined by updating a frequency table substantially as the transaction data occurs. The frequency table may also include a portion which decays over time. The decay portion is produced by instructions within the instruction set on the machine-readable medium.

To this point, the discussion has centered on more generalized specific embodiments of the invention. In the following paragraphs, specific embodiments directed toward telecom and toward financial instruments will be set forth.

Overview of Example Embodiments

Frequent-behavior Sorted Lists are an effective profile-driven analytic technique for fraud detection. Features constructed from such lists improve fraud detection performance in a broad range of applications including telecommunications (telecom) fraud, and debit and credit card fraud. A carefully designed analytic tool efficiently maintains a Frequent-behavior Sorted List associated with the profiled entity (telephone or debit card for example). The analytic tool significantly reduces the computation burden of determining the frequent behavior patterns of a profiled entity. The resulting frequent-behavior lists are then used to derive specific fraud feature variables based on abnormalities in the behavior of the entity. A behavior abnormality is observed when, for example, a customer has often utilized a particular ATM before with their debit/credit card or transferred money to a particular destination account before using an online banking application and is now using a different ATM, or depositing the money into a different account, respectively.

Signatures also can be derived from frequent-behavior sorted lists and used to identify potential fraudsters from already caught fraudsters using distance-based metrics associated with the two different entities' behavior sorted lists. An efficient signature matching method is devised for use in high-throughput environments. Jointly, efficient analytic tools and corresponding derived fraud features enable real-time execution utilizing behavior lists in fraud detection over a broad range of applications while removing the need for storing a supporting database of past transactions to determine frequent-entities in the transaction history.

Example Embodiment: Telecom Application

To facilitate the presentation of various example embodiments, this section describes the Frequent-behavior Sorted List method as used in the telecommunication context.

In a telephone conversation, a caller dials a number to reach an intended callee. The number that identifies the callee is called the destination number. Often times, the Frequent-sorted list of destination numbers associated with a caller is relatively stable. These frequently dialed numbers are typically destination telephone numbers of family members and friends. If the caller is a fraudster, many times the frequently dialed or called numbers are to the other members of a fraud ring. Hence, it can be quite predictive in fraud detection for a caller's calling behavior to be captured by lists that track the most frequently-called destination numbers. Calls made to numbers not on most-frequently-called lists bear higher risk than those numbers on the list. Such calls can be an indication of a stolen or cloned phone. Combining whether the call is frequent or not-frequent with other attributes of the call such as time/day patterns and whether the call is premium/international type call can point to an even higher probability that the current call corresponds to a fraudulent use of the phone.

Frequent-destination-number Sorted List (Frequent-number list) is an application of the Frequent-behavior Sorted List method for detection of telecom fraud. For each caller, a profile is generated that mathematically summarizes the callers various calling patterns. The profile is maintained and updated upon each call. Elements contained in the profiles called predictive variables (or just variables) are also updated from call to call and used in the prediction of fraud. A group of variables, discussed below, are constructed based on the frequent-number list method will now be described in more detail.

The frequent-number list method utilizes the following three tables, stored in profiles:

1. A table of n most frequently dialed destination numbers (number table)
2. A table of pseudo-frequencies of the corresponding n most frequently dialed destination numbers (frequency table)
3. A table of ranking for these numbers (ranking table)

These three tables are collectively referred to as the frequent-number list in the following description. It should be noted that the "frequencies" stored in the frequency table are not true "frequencies" of the corresponding destination numbers but are pseudo-frequencies that approximate or estimate the true frequencies and provide a relative ranking of frequencies of the destination numbers in the number list. Another item of note is that in telecom for residential customers a table size of 14 is often used. The table size has a historical basis in telecom applications. It should be noted that this methodology is equally applicable to different size tables.

For illustrative purposes, the following an example of a frequent-number list used in a telecom fraud application.

TABLE 1

Frequent-Number List Example

| Number Table | | Frequency Table | | Ranking Table | |
|---|---|---|---|---|---|
| index | Dest-number | index | Frequency | Ranking | Index to number |
| 1 | 1111 | 1 | 0.2 | 1 | 11 |
| 2 | 2222 | 2 | 0.7 | 2 | 13 |
| ... | ... | ... | ... | ... | ... |
| 11 | 1234 | 11 | 3.1 | 11 | 12 |
| 12 | 2323 | 12 | 0.9 | 12 | 2 |
| 13 | 3434 | 13 | 2.3 | 13 | 14 |
| 14 | 4321 | 14 | 0.4 | 14 | 1 |

The Number Table and Frequency Table are coupled via common indices. From the above Number Table and Frequency Table, the frequency for number destination number "1111" (with index 1 in the Number Table) is 0.2. The frequency for number destination number "2222" (with index 2 in the Number table) has a frequency of 0.7. The frequency for number destination number "4321" (with index 14) has a frequency of 0.4. The ranking table stores the common indices of number table and frequency table in the decreasing order of the frequency. For example, referring to the Ranking table, index 11 in the number table (corresponding to number "1234") has the highest frequency (3.1), index 13 (corresponding to the number "3434") the second-highest frequency (2.3), and so on.

Upon each new call, the Number table is looked up to determine whether the destination number is in the list. If so, then the rank of the number is retrieved from the Ranking table. Then, various variables are calculated based on whether the destination number is a frequently dialed or not-frequently dialed number. Once the lookup is complete, the tables are updated as follows:

All the frequencies in the Frequency table are decayed by a multiplicative factor β, 0<β<1;

Then, Number table and Frequency table are updated as follows:

If the current number is not in the Number table, then least-frequent number (determined by the Ranking table) is replaced with the current number if the least frequent number's frequency (based on the Frequency table) is less than a threshold δ, $$0 < \delta < \frac{1}{1-\beta}$$

(NOTE: there are a multitude of other implementations for determining the threshold δ including use of adaptive thresholds based on match rates and recycling rates associated with the Number table). The frequency of the current number is initialized to be α. (NOTE: α is typically equal to a frequency update of 1 in most telecom fraud applications)

If the current number is already in the Number table, then its frequency is increased by δ (NOTE: δ is typically equal to a frequency update of 1 in most telecom fraud applications).

Finally, the Ranking table is updated accordingly to reflect any changes to the ranking of numbers based on the update.

From the frequency update method described above, it should be noted that "frequencies" in the frequency table are not true frequencies corresponding to the dialing of destination numbers. But, the above frequency updating method provides an efficient and recursive approximation for the true frequencies and the relative ranking of frequencies of the different destination numbers. This methodology is essential for fraud detection as a determination of fraud needs to be made on sub-second time scales utilizing profile structures and can not be based on searches in databases of historical calling behavior.

The decay parameters β can be tuned for fast (with small β) or slow (with large β) decay of the past history (this is related to the "memory" that the profile has of past history of calling of destination numbers). Values in the range from 0.6 to 0.95 have been empirically found to be most suitable for β in telecom applications. The parameter δ can be tuned based on how quickly entities are up for recycling; typically the table size is made large enough that entities that are frequent will have an opportunity to increase their rank in the table before being a candidate for recycling. Recent applications include a real-time adjusting of the value of δ based on the frequency of recycling to maintain reasonable number turn-over on the Frequent-Number List.

The third step of determining the ranking of the number can be time-consuming if implemented with common efficient sorting algorithms whose time-complexity is O(n log n), where n is the size of the table. To update the Ranking table more efficiently, a methodology is used in linear time as described below.

An Efficient Ranking-Table Updating Methodology

One key to this methodology is that it is unnecessary to recalculate the Ranking table from scratch with each new transaction. Note the following two important features of the table-updating procedure.

1. The decay step (multiplication by β) does not disturb the ranking table
2. The ranking table is stored (from transaction to transaction in the caller profile)

The following linear time-complexity methodology is thus designed to efficiently implement the Ranking table update of the Frequent-List update procedure.

1. Denote by i the index of current number in number table(or the frequency table)
2. Denote by r the rank of current number in ranking table
   i. r=14 if the current number replaces the least-frequent-number out of the table
   ii. Otherwise, r is the rank of current-number prior to updating
3. By binary-search of the sorted ranking table, the new rank of the current number, r', with respect to its updated frequency (this is the frequency that is updated by α after all the frequencies in the Frequency table are decayed by multiplication by β) can be found. According to this frequency-updating methodology, r'<=r.
4. Shift each index entry in the ranking table from r' to r−1 one-rank downwards and then insert index i into position r'

This methodology takes at most n+log n extra operations:

(Step 1-2) i and r are obtained as the by-product of the step of check if current number is one of the k -most-frequent numbers, k≦n.

(Step 3) takes at most log n comparisons (Step 4) takes at most n copy operations Continuing with the example discussed thus far with respect to Table 1, the Ranking table update methodology will be further detailed. Suppose the current number is "4321", which happens to be in the table and is indexed with 14 in the Number table. From the Ranking table, index 14 currently has a ranking of 13. Frequency table then gets updated (see Table 2 below). Suppose, after the Frequency table update that the frequency of number "4321" now has a rank of 11 (by binary-search of the ranking table). To update the ranking table, all we need to do is to shift each index entry for ranking 11 to 12 in the ranking table one-rank downwards (new rankings of 12 and 13) and then insert the index of "4321", 14, in the 11$^{th}$ entry of the Ranking table (See below).

TABLE 2

Example of Frequency and Ranking Table Update

| Updated Frequency table | | Updated Ranking table | |
|---|---|---|---|
| Index | Frequency | Ranking | Index to number |
| 1 | 0.2 * 0.9 | 1 | 11 |
| 2 | 0.7 * 0.9 | 2 | 13 |
| ... | ... | | |
| 11 | 3.1 * 0.9 | 11 | 14 |
| 12 | 0.9 * 0.9 | 12 | 12 |
| 13 | 2.3 * 0.9 | 13 | 2 |
| 14 | 0.4 * 0.9 + 1 | 14 | 1 |

Predictive Variables Based on Frequent-Number Lists

Calls have basic characteristics used to describe and rate the call. Some of the basic characteristics include duration, international/premium-rate, and cost. Variables that are jointly constructed from such features and Frequent-number Sorted Lists are shown to be predictive over a wide number of implementation, geographic regions, and operating conditions, and the like.

In fraud applications, a non-frequent call is defined as a call where the destination number is not one of the k most frequent numbers in Frequent-number Sorted Lists (For illustration purposes, we take k to be seven in the following example). Simple variables can be constructed in a straightforward manner. For example, a binary variable "NOTTOP7" can be defined to take value 1 if a call is a non-frequent call and 0 otherwise. Combining "NOTTOP7" with the cost of the calls allows one to construct the variable "NOTTOP7_COST" to take a non-zero value if the current call is a non-frequent call and 0 otherwise. The larger the value that the variable "NOTTOP7_COST" takes, the higher the risk a call bears.

Based on the simple variables above, sophisticated variables then can be constructed. One class of such variables are "event average" variables. The event average variables approximate the average of discrete events based on the following iterative formula:

$$\text{NOTTOP7\_VAL\_AVG}_n = e^{-\frac{1}{N}} * \text{NOTTOP7\_COST}_n + (1 - e^{-\frac{1}{N}}) * \text{NOTTOP7\_VAL\_AVG}_{n-1}$$

where N is a decay parameter that controls the contributions of the historical values compared to the current value in the estimate of the average. Roughly speaking, N determines the contributions of values in the past to the average value. Usually N is set from 5 to 40 in telecom fraud applications. Based on the above iterative formula, the value of NOTTOP7_VAL_AVG is computed iteratively from the current value of $\text{NOTTOP7\_COST}_n$ and its previous value $\text{NOTTOP7\_VAL\_AVG}_{n-1}$, which would be stored in the caller's profile.

Another example of a filter based variable definition would include velocity variables that can be constructed from a wide variety of mathematical filters. For example, the variable NOTTOP7_VAL can be computed iteratively from NOTTOP7_COST as follows:

$$\text{NOTTOP7\_VAL}_n = \frac{1-e^{-\alpha}}{1-e^{-\alpha t_n}} \text{NOTTOP7\_COST}_n + \frac{1-e^{-\alpha t_{n-1}}}{1-e^{-\alpha t_n}} e^{-\alpha(t_n - t_{n-1})} \text{NOTTOP7\_VAL}_{n-1}$$

where $t_n$ and $t_{n-1}$ are the time of the current and previous call events and $\alpha$ is a decay parameter and commonly set reflect the time over which a time-based average is desired. Variables, such as NOTTOP7_VAL approximate the "velocity" of cost associated with non-frequent calls. Such "velocity" variables are quite predictive in fraud applications. In the below table examples of such variables that are useful in fraud detection are provided:

TABLE 3

Examples of Frequent-List derived fraud features
Variables Based on Frequent-number Lists

| Derived Variables | Basic variables | Explanation |
| --- | --- | --- |
| NOTTOP7_NUM | NOTTOP7 | Number of non-frequent calls per unit of time |
| NOTTOP7_TIM | NOTTOP7_DUR | Duration of non-frequent calls per unit of time |
| NOTTTOP7_VAL | NOTTOP7_COST | Call cost of non-frequent calls per unit of time |
| NOTTOP7_NUM_AVG | NOTTOP7 | Average number of non-frequent calls |
| NOTTOP7_TIM_AVG | NOTTOP7_DUR | Average duration of non-frequent calls per unit of time |
| NOTTOP7_VAL_AVG | NOTTOP7_COST | Average cost of non-frequent calls |

It is worth noting that with each transaction the profile is updated and all the variables derived from Frequent-number Lists are computed before lists are updated (in other words the rank is determined and used in variable computations before the Frequent-List is updated).

Ratio Variables

For "velocity" variables, changing the decay parameter α, allows flexibility regarding placing different weights on past and current events: the larger the decay parameter, the more the past is reflected in the average and the smaller the decay parameter, the more emphasis on the most recent transactions. Ratios of the velocity variables have been found to be effective measures for increases in suspicious use of a phone. Ratio variables are used to detect and emphasize changes in usage and rate of usage. Such ratio variables can also be constructed from event average variables. The ratios are generally considered accelerations as they indicate a time-dependent change in the velocity associated with an increase in the frequency or value of risky transactions.

Using Signatures Derived from Frequent-number Lists to Detect Organized-fraud and Repeat-Fraud

Overview of this Example Embodiment

The set of most frequent destination numbers called by a caller is usually fairly stable. Therefore, the set of the most frequent destination numbers is treated as a signature, referred to as a calling-signature of a caller. In many cases of organized-fraud, a group of fraudsters share similar calling-signatures. In addition, a repeat fraudster who steals several phones will have a similar calling pattern or signature across all phones. In the repeat fraudster situation, finding similar signatures enables fraud analysts to identify phones linked to the same person despite fake or forged identity information. In organized fraud rings, fraudsters in the ring call one another often. Therefore, when one is caught then others can be quickly identified based on a detected common signature with another fraudster in the ring.

In summary, fraudsters usually call similar sets of destination numbers (usually premium and international numbers) in a short period of time. By exploiting this common fraud trait shared amongst fraudsters, additional fraudsters can be identified from those fraudsters who have already been caught by matching historical calling signatures.

An Efficient Implementation of Signature Matching

There is a need in fraud applications to ensure that the comparisons of signatures are done quickly since most fraud systems provide fraud scores in real-time. One example involves taking the set of the three most frequent destination numbers as signature. A fast approach to match two signatures is based on whether at least two of the three top ranked destination numbers in one signature coincide with two numbers in the signature of a previously caught fraudster. In this example, the three numbers in each signature are denoted by $N_l$, $N_m$ and $N_s$, where $N_l \geq N_m \geq N_s$. Note that a signature $\{N_l^1, N_m^1, N_s^1\}$ matches another $\{N_l^2, N_m^2, N_s^2\}$ if and only if at least one of the following conditions holds:

$$(N_l^1, N_m^1) = (N_l^2, N_m^2),$$

$$(N_l^1, N_m^1) = (N_m^2, N_s^2),$$

$$(N_m^1, N_m^1) = (N_l^2, N_s^2),$$

$$(N_m^1, N_s^1) = (N_l^2, N_m^2),$$

$$(N_m^1, N_s^1) = (N_m^2, N_s^2),$$

$$(N_m^1, N_s^1) = (N_l^2, N_s^2),$$

$$(N_l^1, N_s^1) = (N_l^2, N_m^2),$$

$$(N_l^1, N_s^1) = (N_m^2, N_s^2),$$

$$(N_l^1, N_s^1) = (N_l^2, N_s^2).$$

With the above observation, an efficient implementation of signature matching is conducted as follows. For each caught fraudster, three ordered pairs are constructed from the signature $\{N_l, N_m, N_s\}$. The three ordered pairs are $(N_l, N_m)$, $(N_m, N_s)$ and $(N_l, N_s)$. These ordered pairs are stored as a hotlist in memory. Upon receiving a call, the Frequent-number List of its caller is updated. From the caller's Frequent Number list, three pairs of destination numbers are constructed similarly. Then a comparison is made of each pair against the fraud signature hotlist of number pairs associated with previously detected fraudsters. If one of the pairs matches one of the pairs in the hotlist of number pairs, then a conclusion is drawn that the current signature matches a signature of a previously caught fraudster. Detecting a signature match with a previously detected fraudster is typically used along with rules to generate fraud cases for review, but can also be used to construct other fraud model variables based on matches with previous fraud signatures.

Example Embodiment: Financial Applications

A second application of the Frequent-behavior List is in credit and debit card fraud detection. In the following section, several applications of the Frequent-behavior List to financial card fraud detection are presented.

Debit/Credit Cards

Cardholders can make purchases at Point of Sale (POS) devices at merchants. Merchants include brick and mortar merchants, mail order merchants, phone order merchants, and internet merchants. Cardholders can also withdraw cash from automated teller machine (ATM) terminals. Each individual cardholder has a personal spending behavior that tends to consist of one or more regular patterns. For example, one may shop more often in some types of stores than others (or frequently repeatedly at the same merchant), or one's daily spending may be limited to certain zip codes when not traveling. Still another example is that one may often use a couple of convenient ATMs close to home or work to get cash. The most frequently exhibited spending activity demonstrates a pattern of use for a customer and is less risky than those spending events that are new and infrequent compared to that of the customer's historical pattern of use.

Still more specifically, each individual cardholder has his/her own shopping behavior in terms of "what types of merchants they shop at, where they shop, and when the shop". Individual cardholders also have a cashing behavior in terms of "how much they usually withdraw from the ATM, and where the ATM is located, and when they withdraw from an ATM". Such details are captured in transaction records. Basic information such as transaction date, time, and dollar amount are recorded in the transaction records. Shopping locations are identified via Merchant IDs, merchant names and street addresses, and merchant ZIP codes. Cashing location are similarly identified via ATM ID, ATM-Host Merchant name, Address, and terminal Postal Code (ZIP). Merchandize categories can be identified via Standard Industrial Codes (SICs) or Merchant Category Codes (MCCs). All of these parameters in the transaction record can be used to track frequent behavior.

Entities to Track

The idea of tracking frequency-based spending behavior by Frequent-behavior Lists can be applied to, but not limited by following entities associated with spending patterns.

Location Based Entities:

Location based entities would include those related to ATMs such as ATM terminal ID, ATM-Host Merchant Name, and the Address and Postal Code of the ATM. With respect to Merchants the relevant entities would include Merchant ID and Merchant Name along with location information such as Merchant Address and Merchant Postal Code.

Frequent ATM List

Each ATM can be identified by its ATM Terminal ID. Lists of frequent-visited ATMs capture regular patterns of a cardholders' cashing or withdrawal behavior. The ATM-host merchant name, address, and postal code can be also be used to identify the ATM.

Frequent-Merchant-ID List

Each Merchant-ID uniquely identifies a merchant. By tracking a list of frequently visited merchants, regularity in the cardholder's purchasing patterns including their favorite merchants can be identified. Spending that aligns more closely to regular spending patterns identify less risky transactions.

Frequent-Postal-code List

Each postal code covers a large geographic area, and usually the cardholder will make purchases or withdraw cash within certain local geographic areas when not traveling. The postal codes of merchants and ATM transactions can be tracked in two separate lists (i.e., Frequent-ATM-Postal-Code List and Frequent-Merchant Postal Code List) or one single list. The granularity (size of the geographic region) can be controlled by how many digits used to specify the postal code of the merchant or the ATM.

Frequent-Merchant-Name List

The above frequent lists are all based on regular patterns associated with geographic or physical locations. It is also observed that cardholders usually patronize the same chain stores. For example, one may favor Sears for clothing and Starbucks for their coffee. Sears stores are located in different geographic locations within a city and a cardholder may visit more than one location of the same chain. Geographic location based frequent lists will not capture "common brand" shopping behaviors. To this end, lists of store chain names can be constructed to track such brand/chain loyalty shopping patterns.

Time-Based Entities
Frequent-Transaction-Time List

The shopping and cashing behavior of individual cardholders exhibits temporal pattern as well. A person may have a pattern as regard to when they withdraw cash. For example, some people may always go to an ATM on weekdays, some on weekends, some at daytime, or some at night time, or the like. Another common example, is when people shop for groceries, some will make a weekly trip on certain days or only weekdays or weekends.

Merchant Category-Based Entities
Frequent-MCC (Merchant Category Code)-Code List:

Different people may spend differently. Some consumers spend a lot in restaurants. Other consumers spend a lot on sports and recreation. Still others spend a lot on clothing. Tracking the Frequency of MCC tracks the types of merchants a cardholder frequently visits.

Frequent-Gas-Station List

When not traveling, people tend to go frequently to only a few gas stations close to home or work. The gas-stations can be recognized by MCC code (5542 and 5541), and they can be uniquely identified by merchant I.D., or the combination of merchant name, address and zip code. Given that gas transactions are typically risky transactions associated with fraudulent card use, knowing that the gas station is a frequently visited one in the history of the cardholder helps identify those gas transactions that are abnormal for the card.

Utilizing the Frequency-List Information and Variable Derivation

Similar to the basic variables defined in the telecom example, a NOTTOP-N variable in the card fraud area can be defined. The NOTTOP-N variable takes value of 1 when the new transaction does not appear in the TOP-N list, and takes values of 0 if it does. Generally, the NOTTOP-N transactions are more risky.

Additional information from the Frequent-Behavior list can also be used to design basic variables, such the rank of each new transaction in the list, and more specifically, whether it is a HIT (found itself in the list) or MISS (not found itself in the list). Generally, ranking low on the list or a MISS (no match with any entry on the table) is more risky.

Combining with the dollar amount for each ATM transaction, we can construct basic variable such as NOTTOP_N ATM_AMT to take value of the ATM transaction amount if it is a non-frequent ATM transaction with respect to the list and 0 otherwise. The larger a value variable NOTTOP_N_ATM_AMT takes, the higher the risk the transaction bears.

Using the same methodology introduced in the telecom application, complex variables based on these basic variables can be derived. Event average and velocity variables can be derived as illustrated in the following table, based on the transaction dollar amount (corresponding to the cost of a phone call in the telecom example). These dollar based variables, or frequency variables, provide additional predictive power in card fraud detection. Below are examples associated with a frequent-ATM-list:

TABLE 4

Examples of Frequent-Behavior List Variables for ATM card fraud

| Derived Variables | Basic variables | Explanation |
|---|---|---|
| NOTTOP_N_ATM_NUM | NOTTOP_N_ATM | Number of non-frequent ATMs in a period of time or a number of events |
| ATM_MISS_NUM | ATM_MISS | Number of misses in the list in a period of time or a number of events |
| NOTTOP_N_ATM_DOL | NOTTOP_N_ATM_AMT | Dollars spent on the non-frequent ATMs in a period of time or a number of events |
| ATM_MISS_DOL | ATM_MISS_AMT | Dollars spent on the ATMs missed in the list in a period of time or a number of events |
| ATM_RANK_AVG | ATM_RANK | Average ranking of the ATMs in a period of time or a number of events |

Similarly, ratio variables of velocity and event variables can also be derived to determine acceleration or deceleration associated with risky non-frequent transaction activity associated with the payment card.

In addition, a risk table for different ranks in the list can be generated. The risk table information is then used to identify the risk of the current transaction. Also the data population can be split into two groups: one group that belongs to TOP_N, the other belongs to NOTTOP_N. Each model can be trained separately, which could further improve the fraud detection performance.

List Compression

Tracking multiple Frequent-Behavior lists could take a lot of profile space to store the frequency-lists. To save space, instead of storing the Key and frequency separately in two units, the two parts can be compressed into one unit as illustrated in the following table (assuming we used a 32-bit unit). The IDs, addresses, names, and ZIPs can be hashed into integers that take fewer bits (say, 16 bit). Practically speaking, 16 bit precision floats are sufficient for frequencies.

| 16 bits | 16 bits |
|---|---|
| Key/Hash | Frequency |

The list size can be determined by the data statistics to maintain certain miss-rates (the rate that new transactions do not find themselves on the list). Typically, a list size of 4 entities is sufficient for tracking frequently used ATMs by a cardholder.

Organized-Fraud Detection Using Signatures

Similar to the case of Frequent-number lists in the Telecom context, signatures can be constructed from the frequent-behavior lists considered in the above Payment Card examples to detect organized fraud in payment card transactions. For example, the purchases associated with a ring of fraudsters using stolen cards might concentrate on a small number of merchants or a small number of merchandize categories. By matching the signatures (of a card) over a short period to the signatures of recently caught fraudster's cards, cards that have a high likelihood of being compromised and associated with an organized fraud ring can be identified. This likelihood can be used directly with the card-level fraud score to improve fraud detection and increase suspicion associated with an abnormal transaction.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed:

1. A computer system comprising:
   at least one data processor;
   memory coupled to the at least one data processor for encoding instructions comprising:
      a frequency determination component to determine frequency information associated with a plurality of data transactions, the plurality of data transactions comprising telephone calls;
      a conversion component to convert the frequency information into a frequency variable; and
      a prediction component to predict fraud based on the frequency variable from the conversion component;
   wherein, for each caller of a telephone call, a profile is generated mathematically summarizing calling patterns of the caller, the profile being maintained and updated upon each call, wherein the conversion component converts the frequency information into the frequency variable using a frequent-number list method, the frequent-number list method utilizing three tables stored in the profile, a number table being a table of n most frequently dialed destination numbers, a frequency table comprising a table of pseudo-frequencies of corresponding n most frequently dialed destination numbers, and a ranking table for ranking the n most frequently dialed destination numbers;
   wherein upon each new call:
      the number table is looked up to determine that a destination number for the new call is listed in the number table;
      a rank of the destination number for the new call is retrieved from the ranking table;
      frequencies in the frequency table are decayed by a multiplicative factor;
      the number table and the frequency table are updated to reflect the new call; and
      the ranking table is updated according to the updates to the number table and the frequency table.

2. The computer system of claim 1 wherein the prediction component includes a model that predicts fraud in response to a plurality of variables, including the frequency variable and derived variables of the frequency variable.

3. The computer system of claim 1 wherein the frequency determination component includes a portion which decays past data transactions when a new data transaction is detected.

4. The computer system of claim 3 wherein a new frequency related to a data transaction replaces an entry in the frequency table that has a least frequency and the new frequency is below a selected frequency threshold.

5. The computer system of claim 3, wherein the frequency variable is used with at least one other variable to predict fraudulent activity.

6. The computer system of claim 3 wherein predicting whether an activity is fraudulent includes a model that utilizes the frequency variable.

7. The system of claim 1, wherein frequency information is tracked and updated substantially as the data transaction occurs.

8. A method for implementation by one or more data processors comprising:
   determining, by at least one data processor, frequency information associated with a plurality of data transactions, the plurality of data transactions comprising telephone calls;
   converting, by at least one data processor, the frequency information into a frequency variable; and
   predicting, by at least one data processor, fraud based on the frequency variable;
   wherein, for each caller of a telephone call, a profile is generated mathematically summarizing calling patterns of the caller, the profile being maintained and updated upon each call, the frequency information being converted into the frequency variable using a frequent-number list method, the frequent-number list method utilizing three tables stored in the profile, a number table being a table of n most frequently dialed destination numbers, a frequency table comprising a table of pseudo-frequencies of corresponding n most frequently dialed destination numbers, and a ranking table for ranking the n most frequently dialed destination numbers;
wherein upon each new call:
the number table is looked up to determine that a destination number for the new call is listed in the number table;
a rank of the destination number for the new call is retrieved from the ranking table; frequencies in the frequency table are decayed by a multiplicative factor;
the number table and the frequency table are updated to reflect the new call; and
the ranking table is updated according to the updates to the number table and the frequency table.

9. The method of claim 8, further comprising: predicting, by at least one data processor, fraud in response to a plurality of variables, including the frequency variable and derived variables of the frequency variable.

10. The method of claim 8, further comprising, decaying, by at least one data processor, past data transactions when a new data transaction is detected.

11. The method of claim 10, further comprising: adding, by at least one data processor, a new frequency related to a data transaction replaces an entry in the frequency table that has a least frequency and the new frequency is below a selected frequency threshold.

12. The method of claim 10, further comprising: using, by at least one data processor, the frequency variable with at least one other variable to predict fraudulent activity.

13. The method of claim 10, further comprising: predicting, by at least one data processor, whether an activity is fraudulent by using a model that utilizes the frequency variable.

14. The method of claim 8, further comprising: tracking and updating, by at least one data processor, frequency information substantially as the data transaction occurs.

15. A computer program product, embodied on a non-transitory computer-readable medium, the product comprising instructions to cause a data processing apparatus to perform operations comprising:
determining frequency information associated with a plurality of data transactions, the plurality of data transactions comprising telephone calls;
converting the frequency information into a frequency variable; and
predicting fraud based on the frequency;
wherein, for each caller of a telephone call, a profile is generated mathematically summarizing calling patterns of the caller, the profile being maintained and updated upon each call, the frequency information being converted into the frequency variable using a frequent-number list method, the frequent-number list method utilizing three tables stored in the profile, a number table being a table of n most frequently dialed destination numbers, a frequency table comprising a table of pseudo-frequencies of corresponding n most frequently dialed destination numbers, and a ranking table for ranking the n most frequently dialed destination numbers;
wherein upon each new call:
the number table is looked up to determine that a destination number for the new call is listed in the number table;
a rank of the destination number for the new call is retrieved from the ranking table;
frequencies in the frequency table are decayed by a multiplicative factor;
the number table and the frequency table are updated to reflect the new call; and
the ranking table is updated according to the updates to the number table and the frequency table.

16. The article of claim 15, wherein the operations further comprise: predicting fraud in response to a plurality of variables, including the frequency variable and derived variables of the frequency variable.

17. The article of claim 15, wherein the operations further comprise: decaying past data transactions when a new data transaction is detected.

18. The article of claim 17 wherein the operations further comprise: adding a new frequency related to a data transaction replaces an entry in the frequency table that has a least frequency and the new frequency is below a selected frequency threshold.

19. The article of claim 17, wherein the operations further comprise: using the frequency variable with at least one other variable to predict fraudulent activity.

20. The article of claim 15, wherein the operations further comprise: predicting whether an activity is fraudulent by using a model that utilizes the frequency variable; and tracking and updating frequency information substantially as the data transaction occurs.

* * * * *